United States Patent [19]
Andrejasich et al.

[11] Patent Number: 4,890,492
[45] Date of Patent: Jan. 2, 1990

[54] DIFFERENTIAL PRESSURE LEVEL SENSOR WITH TEMPERATURE SENSING ELEMENTS

[75] Inventors: Raymond J. Andrejasich, Carmel; Laurence S. Slocum; Sara M. Mussmann, both of Indianapolis, all of Ind.

[73] Assignee: Emhart Industries, Inc., Indianapolis, Ind.

[21] Appl. No.: 240,499

[22] Filed: Sep. 6, 1988

[51] Int. Cl.⁴ .................................................. G01F 23/00
[52] U.S. Cl. ......................................... 73/292; 73/301; 73/304 R
[58] Field of Search ............... 73/290 R, 301, 292, 73/304, 291, 290, 295, 304 C, 304 R

[56] References Cited

U.S. PATENT DOCUMENTS

| | | |
|---|---|---|
| 3,100,885 | 8/1963 | Welkowitz et al. |
| 3,153,342 | 10/1964 | Pierce et al. ................. 73/301 |
| 3,511,090 | 5/1970 | Ehrenfried et al. ............ 73/301 |
| 3,583,221 | 6/1971 | Ehrenfried et al. ............ 73/301 |
| 3,653,262 | 4/1972 | Ehrenfried et al. ............ 73/301 |
| 3,753,200 | 8/1973 | Niejadlik .................... 73/301 |
| 3,783,689 | 1/1974 | Ehrenfried et al. ............ 73/301 |
| 3,792,407 | 2/1974 | Ehrenfried et al. ............ 73/301 |
| 3,921,450 | 11/1975 | Pfister ...................... 73/295 |
| 3,955,416 | 5/1976 | Waiwood ..................... 73/295 |
| 4,231,025 | 10/1980 | Turner, Jr. .................. 340/521 |
| 4,382,382 | 5/1983 | Wang ........................ 73/304 |
| 4,601,201 | 7/1986 | Oota et al. ................. 73/304 C |
| 4,679,432 | 7/1987 | Draeger ..................... 73/295 |
| 4,685,332 | 8/1987 | Betterton et al. ............. 73/309 |
| 4,702,107 | 10/1987 | Guerrini et al. .............. 73/319 |
| 4,730,489 | 3/1988 | Hoekstra .................... 73/304 C |
| 4,745,293 | 5/1988 | Christensen ................. 250/577 |
| 4,747,062 | 5/1988 | Esau ........................ 364/509 |
| 4,748,846 | 6/1988 | Haynes ...................... 73/290 |

FOREIGN PATENT DOCUMENTS

| | | |
|---|---|---|
| 2246557 | 9/1972 | Fed. Rep. of Germany .... 73/304 R |
| 669808 | 10/1964 | Italy ....................... 73/304 R |
| 599540 | 11/1977 | Switzerland ................ 73/304 R |

OTHER PUBLICATIONS

Page from Spectra Symbol Brochure describing SOFTPOT TM Membrane Potentiometer & SOFTSTICK TM Membrane Controller published in Dec. 1986 or earlier.
A Spectra Symbol Corporation Brochure on the SOFTPOT TM Membrane Potentiometer published Jan. 1987 or earlier.

Primary Examiner—William A. Cuchlinski, Jr.
Assistant Examiner—Jeffrey J. Hohenshell
Attorney, Agent, or Firm—Carl A. Forest

[57] ABSTRACT

A strip of resistive carbon is deposited on a longitudinal plastic film and a strip of conductive copper is deposited on a second film. The two film strips are glued together with the resistive and conductive strips opposing to form a sealed envelope having a longitudinal cavity. This sandwich is placed in a flexible extruded tube membrane and the whole inserted in a longitudinal slot in a frame, with a channel communicating with the slot and the exterior of the frame. Liquid in a tank compresses the envelope, causing the copper and carbon strips to contract at a point depending on the level. The change in resistance of the carbon-copper circuit with level produces a changing voltage which is processed to provide a signal indicative of the level of in the tank. Temperature sensors in the frame provide the temperature of the at various levels.

8 Claims, 2 Drawing Sheets

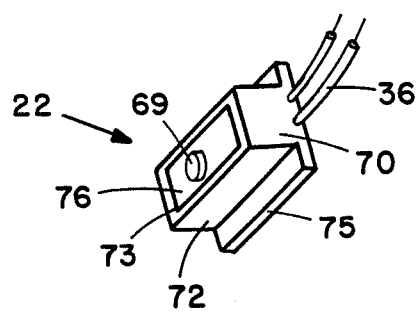
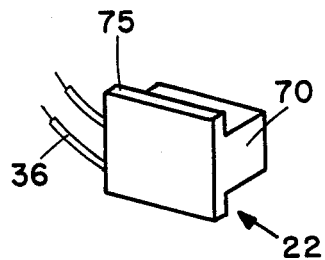
FIG. 5A
FIG. 5B
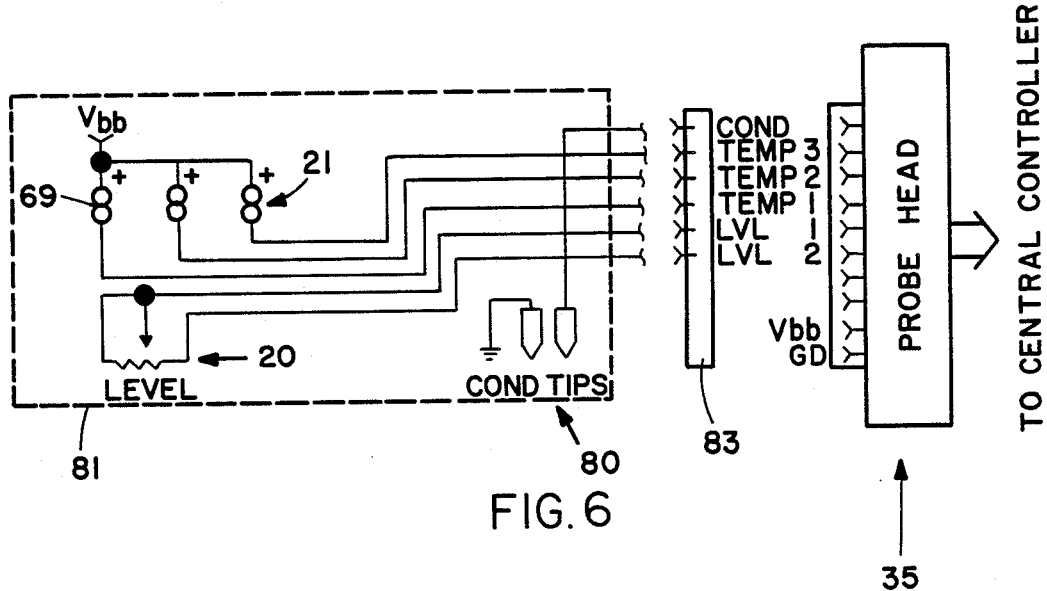
FIG. 6
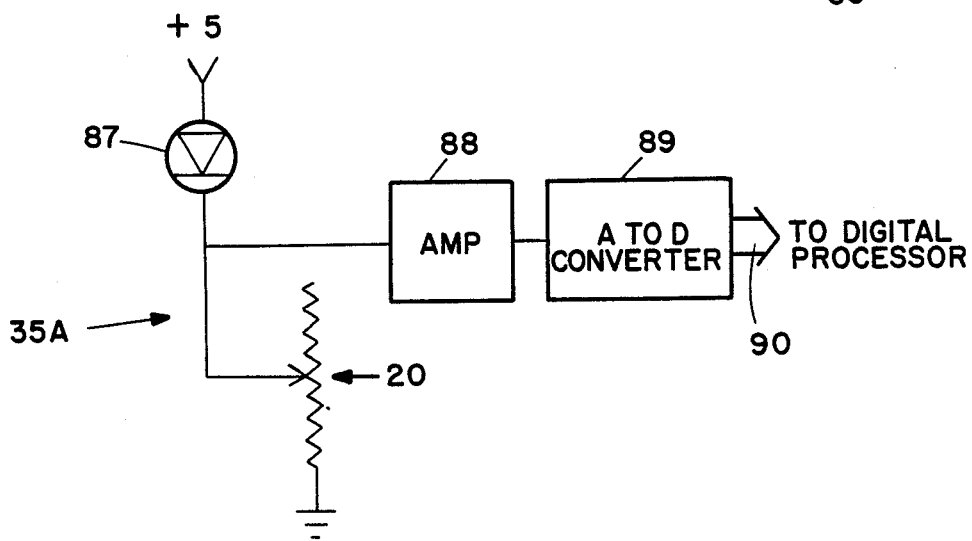
FIG. 7

DIFFERENTIAL PRESSURE LEVEL SENSOR WITH TEMPERATURE SENSING ELEMENTS

BACKGROUND OF THE INVENTION

1. Field of the Invention. The present invention in general relates to level sensors for sensing the level of liquid or other substances in relatively deep tanks, such as underground gasoline storage tanks, and more particularly to such a sensor which is relatively inexpensive and yet is capable of measuring liquid level continuously over a relatively large depth range.

2. The art relating to level sensing is voluminous. Some level sensors sense discrete levels. See for example U.S. Pat. No. 3,783,689 issued to Albert D. Ehrenfried et al; No. 4,382,382 issued to Jish M. Wang; No. 3,955,416 issued to William Paul Waiwood and No. 4,756,076 issued to Jerry F. Dyben et al. These devices generally use resistance type sensors combined with simple integrated circuit electronics. Others measure the level continuously. See for example U.S. Pat. No. 3,100,885 issued to W. Welkowitz et al; No. 4,679,432 issued to Erich Draeger; No. 4,685,332 issued to Joseph T. Betterton et al; No. 4,702,107 issued to Giampaolo Guerrini et al; No. 4,745,293 issued to Douglas A. Christensen; No. 4,747,062 issued to Norman D. Esau, and No. 4,748,846 issued to John S. Haynes. These generally use more complex measuring devices such as ultrasonics, optics, etc. combined with sophisticated electronics. The latter continuous devices are generally more accurate than the former discrete devices. However, the former are generally simpler and less expensive than the latter. It would be highly advantageous to have a level sensor that utilized relatively simpler and less expensive technology of resistance type sensors and simple integrated circuit electronics and at the same time measured the level continuously.

It is known to measure both the level and temperature in a tank with a single probe. See for example U.S. Pat. No. 4,231,025 issued to John H. Turner, Jr. and the co-pending U.S. Pat. Application Ser. No. 07/116,920 by the present inventors. Membrane potentiometers for use as touch-activated switches are also known.

SUMMARY OF THE INVENTION

It is an object of the invention to provide a continuous type level sensor that is relatively simple and inexpensive to manufacture.

It is another object of the invention to provide the above object in a level sensor that is reliable and durable when exposed to hydrocarbons and water.

It is another object of the invention to provide one or more of the above objects and at the same time provide sensor probe assembly that is mechanically and electrically rugged and simple to install.

The invention provides a flowable substance level sensor comprising: a first longitudinal strip comprising a continuous strip of resistive material; a second longitudinal strip comprising a continuous strip of material having relatively high conductivity compared to the resistive material; envelope means for forming a longitudinal envelope having a longitudinal cavity, the first and second strips being supported by the envelope and oppositely disposed in the cavity, the envelope being sufficiently rigid to hold the strips apart under normal atmospheric pressures and sufficiently flexible to permit the weight of flowable substance incident on the exterior surface of the envelope to force the strips together. Preferably the envelope means comprises are plastic film and the first and second strips each are carried on the surface of the plastic film. Preferably the envelope means comprises two longitudinal strips of plastic material fastened together to form a hollow plastic sandwich. Preferably the envelope means further comprises a sheath enclosing the plastic sandwich, the sheath being made of material impervious to water and hydrocarbon. Preferably the level sensor includes a rigid frame having a longitudinal slot for receiving the sandwich enclosed in the sheath and a channel communicating between the slot and the exterior of the frame. Preferably the level sensor further comprises a temperature sensor means for sensing the temperature at one or more levels along the longitudinal strips. Preferably the temperature sensor means comprises one or more temperature sensor elements and one or more carriers, each sensor element carried by a carrier and further including a rigid frame having a first longitudinal slot for receiving the envelope and a second longitudinal slot for receiving the one or more temperature sensor carriers. Preferably, the level sensor further comprises digital electronic means for electrically communicating with the first and second strips and for providing a digital signal characteristic of the level. Preferably the level sensor further comprises a sensor probe housing having a cap portion containing the electronics means and a rigid longitudinal body portion for housing the envelope. Preferably the body portion of the housing includes a means for venting the body portion to the lower portion of a liquid tank and the envelope includes a means for venting the envelope externally of the same liquid tank.

The level sensor according to the invention not only is both capable of continuous readings and less expensive than prior art sensors, but it also is lighter and more rugged than the prior art sensors. Numerous other features, objects and advantages of the invention will become apparent from the following detailed description when read in conjunction with the accompanying drawings.

BRIEF DESCRIPTION OF THE DRAWINGS

In the drawings.

FIGS. 5A and 5B are front and back perspective views respectively of the temperature sensor unit of a sensor probe of FIGS. 1 and 3;

FIG. 6 is an electrical circuit diagram of one embodiment of the sensor electronics according to the invention; and FIG. 7 is an electrical circuit diagram of an alternative embodiment of the sensor electronics according to the invention.

DESCRIPTION OF THE PREFERRED EMBODIMENT

Figure 1:
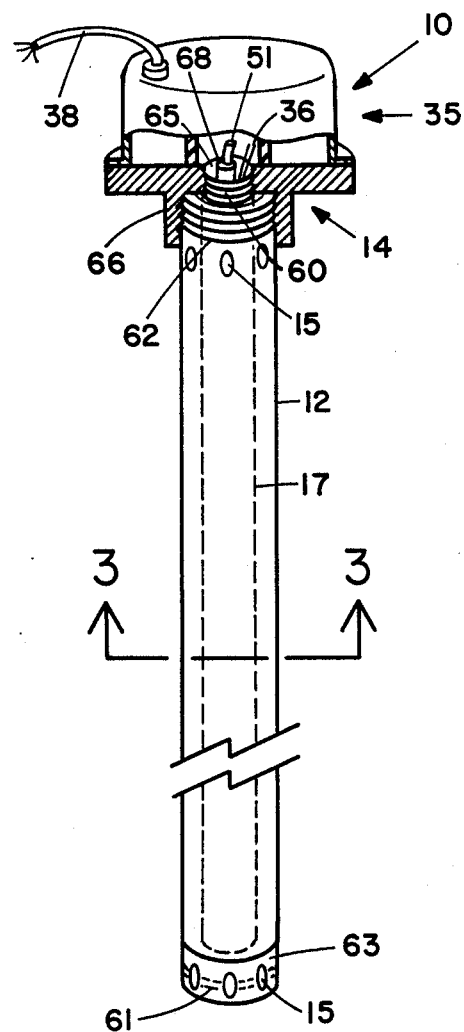
FIG. 1 is a partially cut away and partially cross-sectioned illustration of the preferred embodiment of a level sensor probe according to the invention.

It is understood that the embodiments shown and described herein are by way of illustration of the invention only and are not intended to be limiting of the invention. A preferred embodiment of a level sensor probe 10 is shown in FIG. 1. It includes a probe housing 12 and a probe cap or head 14. The probe housing 12 has openings 15 that vent it to the upper and lower portion of a liquid tank and allow liquid to enter the housing. It also contains a frame 17 which is shown in more detail in FIG. 3. The frame 17 supports a liquid level sensor element 20 and a temperature sensor means 21 comprising several temperature sensor units such as 22. The level sensor element 20 is shown in detail in FIGS. 2 and 4 and includes a first strip 25 of resistive material and a second strip 27 of conductive material, which strips are connected via connectors 30, 31 and 32 (FIG. 2) to electronics 35 within probe head 14; temperature sensor means 21 is also connected to electronics means 35 via wires 36. The electronics means 35 sends a signal representative of the liquid level and liquid temperature to a central controller (not shown) over cable 38.

Figure 2:
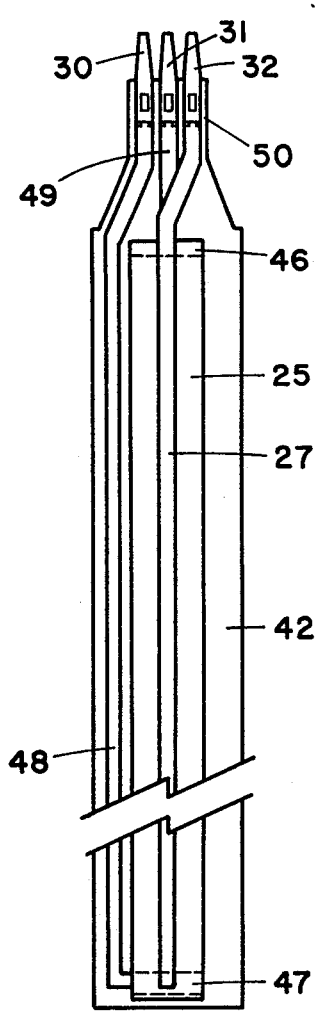
FIG. 2 shows a front plane view of the sensor element of the sensor probe of FIG. 1 without the sheath.
Figure 3:
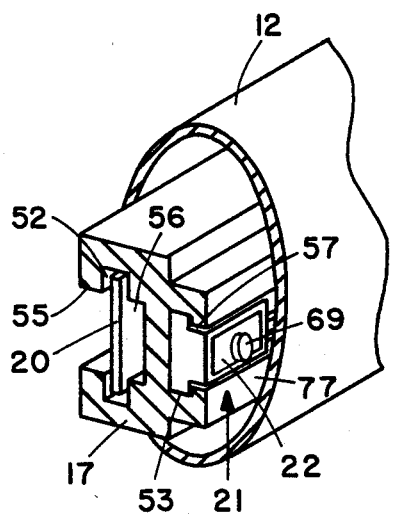
FIG. 3 is a cross-section of the probe of FIG. 1 taken through lines 3—3 of FIG. 1.
Figure 4:
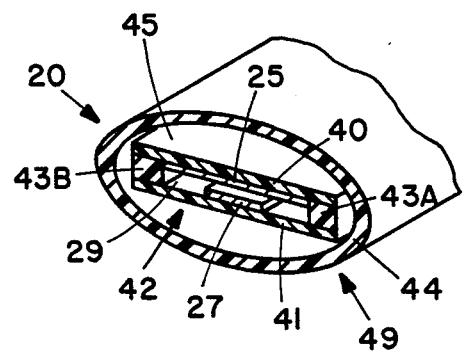
FIG. 4 is a cross-sectional detail of the sensor element of FIGS. 1, 2 and 3 with its sheath.

Turning now to a more detailed description of the preferred embodiment shown in FIGS. 1 through 5B, the level sensor element 20 is shown in detail in FIGS. 4 and 2. The sensor element 20 comprises a first longitudinal strip 25 and a second longitudinal strip 27. The first longitudinal strip 25 is formed of a resistive material, preferably carbon screened onto a strip 40 of plastic film; strip 40 is preferably made of Kapton ™ Polymide plastic available from E.I. DuPont De Nemours & Co., Inc., Film Department, Wilmington, Del. 19898. Second longitudinal strip 27 is a conductive material such as palladium, copper or gold flash sputtered onto plastic film strip 41, which is also preferably Kapton ™. Both strips 40 and 41 may be Teflon ™ coated for a moisture seal, which coated Kapton is called "type F" Kapton. The two strips 40 and 41 are preferably fastened together by a pair of spacers 43A and 43B, which preferably are Kapton ™ strips with adhesive applied to both sides; the adhesive is preferably type SR585 pressure sensitive silicone adhesive available from General Electric Company, Silicone Products Department, Waterford, N.Y. 12188. The spacers 43A and 43B the strips 40 and 41 form a hollow sandwich 42. This sandwich 42 is available as a fabricated unit from Spectron Symbol Corporation, 2534 W. Directors Row, Salt Lake City, Utah 84104. The sandwich 42 is enclosed in a tubular sheath 44, which is preferably extruded, thin-wall, mylar plastic. The resistive element 25 has a contact electrode 46 at its upper end and another electrode 47 at its lower end. A flat strip 48 of conductive material connects electrode 47 to connector 30 while another strip 49 connects electrode 46 to connector 31. Conductive strip 27 is connected directly to electrode 32. Electrodes 46 and 47 and strips 48 and 49 are preferably screened silver, though other materials and methods of deposit may be used. Connectors 30, 31 and 32 are preferably silver-plated copper and are conventional crimp on type. The two plastic film strips 40 and 41 and the sheath 44 are continued up to a narrower neck portion 50 to which the connectors 30, 31 and 32 are crimped. The connectors 30, 31 and 32 are connected via a conventional female plug (not shown) to a cable 51 (FIG. 1) which is sufficiently long to extend into the probe cap 14. The sheath 44 may also be extended by a vent tube 68 (FIG. 1) which is preferably made of mylar and is solvent welded to sheath 44. Neck portion 50 and vent tube 68 comprise a means for venting the cavities 29 and 45. The venting is preferably into the probe cap 14 which is external of the tank. Vent tube 68 and cable 51 may be several feet long in some embodiments in which the probe cap 14 is located on a standpipe which is raised from the tank. The venting is done in a protected location external to the tank to prevent any contamination of cavities 29 and 45. Since tanks are generally externally vented also, this does not create anomalous pressure differentials.

Frame 17 is shown in FIGS. 1 and 3. It has a first slot 52 and a second slot 53. A channel 55 communicates between slot 52 and the exterior of the frame 17. A trough 56 behind slot 52 communicates with the tank volume so that pressure differentials do not build up behind the sensor element 20. Channel 57 communicates between slot 53 and the exterior of the frame 27. A hollow threaded neck 60 is formed on the upper end of frame 17. Frame 17 is preferably formed of extruded aluminum, although CPVC plastic, stainless steel, or other appropriate material may be used. Probe housing 12 is preferably a hollow cylinder formed of stainless steel although CPVC or other appropriate material may be used. Both ends are threaded at 61 and 62 respectively. An end cap 63 having openings 15 is screwed onto threads 61. Cap 63 is made of stainless steel, CPVC or similar material. Probe cap 14 is similar to the probe cap described in co-pending U.S. Pat. Application Ser. No. 06/134,974 which is hereby incorporated by reference, except that the threaded bore 65 is located centrally and it does not have a separate temperature sensor bore as described in that application. Cap 14 also includes a threaded extension 66. The threaded neck 60 of frame 17 is screwed into threaded bore 65 of cap 14 and threads 62 of probe housing 12 are screwed into threaded extension 66.

Temperature sensor means 21 is shown in FIGS. 3, 5A and 5B. It includes several sensor units 22 each of which include a carrier 70 and a sensing element 69. Carrier 70 includes a rectangular, open-ended box portion 72 having a cavity 73, and a flange portion 75. Portion 72 is sized to fit into channel 57 and flange 75 to fit into slot 53. Carrier 70 is preferably molded of CPVC plastic or other material impervious to water and hydrocarbon. Sensing element 69 is preferably a model KTY81-110 silicon temperature sensor available from Amperex, located in Smithfield, R.I. and is held in cavity 73 with epoxy filler 76. Sensing element leads 36 are Teflon coated and pass through holes drilled in box 72. Temperature sensing means 21 preferably includes three or more units 22 which are distributed along frame 17, each being held in place by crimping the aluminum flanges such as 77 at the point where each unit is located.

The spacers 43A and 43B and the strips 40 and 41 of sensor 20 together comprise a means 49 for forming a longitudinal envelope having a cavity 29. The means 49 also preferably includes the sheath 44 which forms an envelope by itself. Preferably the double en elope is used for ensuring hydrocarbon and water do not leak into cavity 29. However, only one of the envelopes is necessary and it may even be formed by heat sealing strips 40 and 41 and spacers 43A and 43B together without the use of adhesive. It also could be formed simply by a conducting and a resistive strip with a pair of insulating spacers between them. Thus the "envelope means" should be interpreted broadly. The level sensor element 20 is slid into slot 52 in frame 17 and is held in place by friction. The aluminum frame may be crimped to hold it if desired. Cable 51 connected to sensor element 20 and wires 36 of temperature sensor means 21 pass through neck 60 of frame 17 into probe cap 14 and connect to electronics 35. The entire probe is held in the tank by a conventional gland nut-o-ring that fits about probe housing 12, and allows the probe to move if the tank compresses, thus preventing damage to the probe.

One embodiment of the electronic circuitry of the level sensor according to the invention is shown in FIG. 6. This embodiment is one incorporating a sensor 80 which differentiates between the air, water and hydrocarbon. The sensing probe portion 81 of the circuitry is connected to the probe head electronics via a connector 83. The probe head electronics processes the signal from the sensor portion 81 and sends a frequency-coded signal containing the sensed information to a central controller. This circuit including the controller, is described in detail in U.S. Pat. Application Ser. No. 07/116,920 which is incorporated herein by reference. Another embodiment of the electrical circuitry 35A is shown in FIG. 7. This includes the level sensor element 20 as described above which is connected to and receives power from a constant current diode 87. Diode 87 is preferably a type IN5297 one milliamp diode available from Motorola, Inc. of Phoenix, Ariz. The diode 87 and level sensor element 20 are also connected to an amplifier 88 which in turn is connected to an A to D converter 89 which provides a digital signal 90 to a digital processor (not shown). The processor in turn sends a signal to a central controller. Similarly, in this embodiment, the voltage from the temperature sensor means 21 would be converted to a digital signal in a manner well known in the art. Preferably the amplifier 88 and A to D converter 89 are preferably a type No. ADC 72 available from Analog Devices, Inc. of Norwood, Mass. The embodiment of FIG. 6 is a means 35 for providing an analog signal to the central controller while that of FIG. 7 is a digital electronic means 35A for providing a digital signal characteristic of the level in the tank.

The invention operates in the following manner. Liquid from the tank enters the probe housing 12 via opening 15 and exerts pressure on sensor element 20, collapsing the envelope 49, pressing resistance strip 25 and conducting strip 27 together at a point just below the liquid/air interface. The distance from the liquid/air interface to the actual point at which the conductive strip 27 and resistive strip 25 make contact is called the sensor offset. This offset depends on the structure of the sensor element 20. In the preferred embodiment the thickness of the spacers 43A and 43B is approximately 0.016 inches, the thickness of conductor 27 and resistive element 25 are each about 0.006 inches and the travel distance between the strips 25 and 27 is 0.010 inches. Strip 25 is about ½ inches wide. Plastic strips 40 an 41 are about 0.005 inches thick. Sheath 44 is preferably made of mylar plastic about 0.003 inches thick. Note that the spacing of the various elements of sensor element 20 and frame 17 are exaggerated in the drawings for clarity. With these dimensions, the offset is about 1 and 3/16 inches. As the level changes, the contact point will move up and down the sensor element 20 and the resistance of the circuit between contacts 31 and 32 will change. The voltage input to the electronic circuitry, i.e. the voltage across LVL 1 and LVL 2 in FIG. 6 or the voltage input to amplifier 88 in FIG. 7, will be proportional to the resistance. This voltage is processed either by analogue or digital means, depending on the embodiment, and a signal representative of the level is sent to the central controller. The analogue processing is described in U.S. Pat. Application Ser. No. 07/116,920 and digital processing is well-known and thus will not be described in detail herein.

A feature of the invention is the probe housing 12 not only provides protection for the sensor element 20, but also reduces the wave action of the liquid in the tank, thus smoothing the sensor response. Another feature is that the sensor 20 provides a linear response, thus simplifying analysis.

A novel level sensor that is simple, inexpensive and rugged and has many other advantages has been described. It is evident that those skilled in the art may now make many modifications and uses of the specific embodiments described without departing from the inventive concepts. For example, other materials or shapes and dimensions may be used, and many equivalent electronic parts and circuits may be substituted. Other features and parts may be added. It is also apparent that the sensor could be used with substances other than liquid, such as grain or other material composed of small particles that "flow" relatively easily. Consequently the invention is to be construed as embracing each and every novel feature and novel combination of features present in the level sensor described.

What is claimed is:

1. A flowable substance level sensor comprising:
   a first longitudinal strip comprising a continuous strip of resistive material;
   a second longitudinal strip comprising a continuous strip of material having relatively high conductivity compared to said resistive material;
   envelope means for forming a longitudinal envelope having a longitudinal cavity, said first and second strips being supported by said envelope and oppositely disposed in said cavity, said envelope being sufficiently rigid to hold said strips apart under normal atmospheric pressures and sufficiently flexible to permit the weight of flowable substance incident of the exterior surface of said envelope to force said strips together; and
   temperature sensor means for sensing the temperature at one or more levels along said longitudinal strips;
   said temperature sensor means comprising one or more temperature sensor elements and one or more temperature sensor carriers, each temperature sensor element carried by a carrier and said flowable substance level sensor further comprising a rigid frame having a first longitudinal slot for receiving said envelope and a second longitudinal slot for receiving said one or more temperature sensor carriers.

2. A level sensor as in claim 1 wherein said envelope means comprises plastic film and said first and second strips each are carried on the surface of said plastic film.

3. A level sensor as in claim 2 wherein said envelope means comprises two longitudinal strips of plastic material fastened together to form a hollow sandwich.

4. A level sensor as in claim 3 wherein said envelope means further comprises a sheath enclosing said plastic sandwich, said sheath being made of material impervious to water and hydrocarbon.

5. A level sensor as in claim 4, wherein said first longitudinal slot receives said sandwich enclosed in said sheath and wherein said level sensor further includes a channel communicating between said first longitudinal slot and the exterior of said frame.

6. A level sensor as in claim 1 and further comprising digital electronic means for electrically communicating with said first and second strips and for providing a digital signal characteristic of the level of flowable substance incident on the exterior surface of said envelope.

7. A level sensor as in claim 6 and further comprising a sensor probe housing having a cap portion containing said electronic means and a rigid longitudinal body portion for housing said envelope.

8. A level sensor as in claim 9 wherein said body portion of said housing includes a means for venting said body portion to the lower portion of a liquid tank and said envelope includes a means for venting said envelope external to the same liquid tank.

* * * * *